United States Patent
Heilmann et al.

(10) Patent No.: US 8,202,428 B2
(45) Date of Patent: Jun. 19, 2012

(54) FILTER DEVICE, PREFERABLY A HOLLOW FIBER DIALYSER WITH CURLED HOLLOW FIBERS

(75) Inventors: Klaus Heilmann, Wendel (DE); Steffen Fritzsche, Aalen (DE)

(73) Assignee: Fresenius Medical Care Deutschland GmbH, Bad Homburg (DE)

( * ) Notice: Subject to any disclaimer, the term of this patent is extended or adjusted under 35 U.S.C. 154(b) by 0 days.

(21) Appl. No.: 12/725,098

(22) Filed: Mar. 16, 2010

(65) Prior Publication Data

US 2010/0170850 A1 Jul. 8, 2010

Related U.S. Application Data

(63) Continuation of application No. 10/204,181, filed on Feb. 3, 2003, now abandoned.

(30) Foreign Application Priority Data

Feb. 17, 2000 (DE) .................................. 100 07 337

(51) Int. Cl.
*B01D 61/26* (2006.01)
*B01D 61/24* (2006.01)

(52) U.S. Cl. .............. 210/645; 210/321.71; 210/500.23; 210/646

(58) Field of Classification Search .................. None
See application file for complete search history.

(56) References Cited

U.S. PATENT DOCUMENTS

| | | | |
|---|---|---|---|
| 3,616,928 A | 11/1971 | Rosenblatt | |
| 4,293,418 A | 10/1981 | Fujii et al. | |
| 4,324,662 A | 4/1982 | Schnell | |
| 4,331,540 A * | 5/1982 | Witsoe | 210/646 |
| 4,336,138 A | 6/1982 | Taniyama et al. | |
| 4,352,736 A | 10/1982 | Ukai et al. | |
| 4,906,375 A | 3/1990 | Heilmann | |
| 5,110,477 A * | 5/1992 | Howard et al. | 210/647 |
| 5,470,659 A | 11/1995 | Baumgart et al. | |
| 5,489,382 A | 2/1996 | Tatebe et al. | |
| 5,650,071 A | 7/1997 | Brugger et al. | |
| 5,779,897 A | 7/1998 | Kalthod et al. | |
| 5,895,571 A * | 4/1999 | Utterberg | 210/241 |
| 6,074,559 A | 6/2000 | Hahmann et al. | |
| 6,641,731 B1 | 11/2003 | Heilmann et al. | |
| 2010/0170850 A1 | 7/2010 | Heilmann | |

FOREIGN PATENT DOCUMENTS

| | | |
|---|---|---|
| DE | 2851687 A1 | 5/1979 |
| DE | 2842958 A1 | 4/1980 |
| DE | 2145188 | 11/1994 |

(Continued)

OTHER PUBLICATIONS

English translation of Office Action mailed on Aug. 25, 2009, for Japanese Patent Application No. 2001-559568.

(Continued)

*Primary Examiner* — Krishnan S Menon
(74) *Attorney, Agent, or Firm* — Kenyon & Kenyon LLP

(57) ABSTRACT

The invention relates to a filter device, preferably for hemodialysis, that consists of a cylindrical filter housing and a bundle of curled hollow fibers. The bundle is arranged in the filter housing. According to the invention, the curled hollow fibers are provided with an essentially sinusoidal texture and a wavelength that is defined by means of certain limits. The invention also relates to a curled hollow fiber and a method for filling a hollow fiber dialyser.

9 Claims, 1 Drawing Sheet

FOREIGN PATENT DOCUMENTS

| | | |
|---|---|---|
| DE | 3850344 | 11/1994 |
| DE | 19857850 | 6/2000 |
| DE | 100 07 327 | 8/2001 |
| EP | 0168783 A1 | 7/1985 |
| EP | 0 168 783 | 1/1986 |
| EP | 0305787 | 3/1989 |
| EP | 0314581 | 3/1989 |
| EP | 0 705 611 | 4/1996 |
| EP | 0844015 | 11/1997 |
| EP | 1 671 695 | 6/2006 |
| GB | 2 009 034 | 6/1979 |
| JP | 50-073882 | 6/1975 |
| JP | 62-045709 | 2/1987 |
| JP | 2-258035 | 10/1990 |
| JP | 1989-01219710 | 10/1990 |
| JP | 1996-110594 | 6/1994 |
| JP | 07-278948 | 10/1995 |
| JP | 1997-553592 | 4/1996 |
| JP | 1997-09273315 | 9/1997 |
| WO | WO 81/01800 | 7/1981 |
| WO | WO 01/60477 | 8/2001 |

OTHER PUBLICATIONS

Decision on rejection of the Opposition to European Patent No. 1 257 333, dated Dec. 10, 2008. (with English translation).

Handbook of Dialysis, John T. Daugirdas, Todd S. Ing.; $2^{nd}$ Ed, 1994, pp. 16-19.

Office Action dated Sep. 8, 2000, from German Patent Application No. DE 100 07 327.1 (with English translation) (D7).

Letter of Patent Attorney Dr. Meyer-Dulheuer to the European Patent Office dated Nov. 29, 2004. (with English translation) (D10).

Examination Report dated Feb. 10, 2005 from European Patent Application No. 01 909 766.6 (with English translation (D11).

Communication dated May 10, 2005 from European Patent Application No. 01 909 766.6 (with English translation) (D12).

Communication Under Article 96(2) EPC dated Sep. 1, 2006 from European Patent Application No. 06 002619.2 (with English translation) (D14).

Examination Report dated Jan. 10, 2012 from European Patent Application No. 06002619.2.

* cited by examiner

FILTER DEVICE, PREFERABLY A HOLLOW FIBER DIALYSER WITH CURLED HOLLOW FIBERS

CROSS-REFERENCE TO RELATED APPLICATION

This application is a continuation of U.S. patent application Ser. No. 10/204,181, filed Feb. 3, 2003, which is expressly incorporated herein in its entirety by reference thereto.

FIELD OF THE INVENTION

The invention relates to filter devices, and more particularly to hollow fiber dialysers for hemodialysis having an essentially sinusoidal texture and curled geometric pattern.

BACKGROUND OF THE INVENTION

Hollow fiber dialysers of a common design have a cylindrical fiber bundle that is arranged, in a cylindrical filter housing. Blood flows through the inside of the fibers, and the dialysate flows in the area between the fibers and the filter housing in a counter flow to the blood. The task of a dialyser is the exchange of matter through the wall of the hollow fibers. The blood usually flows at an even velocity within all fibers. For an optimum of exchange effect, the dialysate should be constantly exchanged externally of the hollow fibers. This way a permanently high concentration difference between the interior and exterior of the fibers is ensured as the driving force for a diffuse exchange of matter.

In a common design dialyser, both the inflow and outflow of the dialysate is connected with the externally positioned fibers of the fiber bundle. That is why it cannot be ensured initially that all fibers in the fiber bundle are flushed with the same amount of dialysate. If a laminar flow of the dialysate in the dialysate area is assumed, the entire dialysate can theoretically flow through between the fiber bundle and the housing without the dialysate entering into the bundle interior. The exchange surface provided by the hollow fiber bundle would not be utilized in this way. In this case, the dialysate flows on a route of the least resistance from the entrance along the fibers in-relating to the dialyser-axial direction toward the output.

From DE 2851687 C2 it is known that the hollow fibers are designed curled, or crimped for an improved penetration of the hollow fiber bundle by the fluid flowing externally of the hollow fibers.

From U.S. Pat. No. 3,616,928 a matter exchange apparatus with crimped hollow fiber bundles is also known.

An oxygenator is described in EP 314581 B1 that has a hollow fiber membrane bundle in the cylindrical housing that is also crimped.

Crimped or curled fibers of a wavelength of about 28 mm are used in known dialysers. The hollow fibers according to prior art with their crimping or curling are used independently of the geometric conditions of the dialyser.

In order to increase the performance of the dialyser, solution approaches already exist in which other fibers have been added to the dialysis fibers in the bundle.

Other solutions intend to wind or knot small bundles of dialysis fibers with a thread, and to combine these small bundles to large bundles. This should enable an improved through flow of the hollow fiber bundle through the fluid flushing the hollow fibers, i.e., the dialysate in the case of a dialyser.

DETAILED DESCRIPTION OF THE INVENTION

Figure 1:
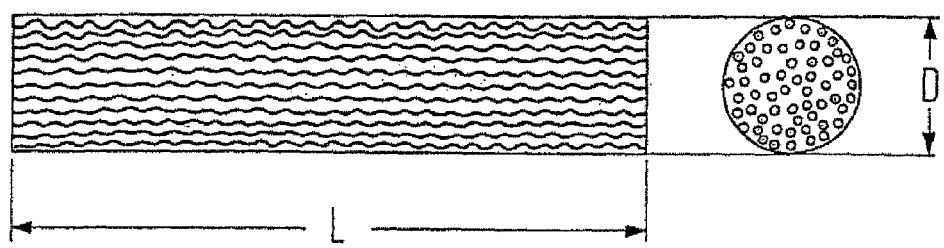
FIG. 1 shows a longitudinal section, or cross section, through a hollow fiber bundle.

It is the task of the invention to make available a generic filter device, such as a hollow fiber dialyser, in which the fluid flow through the hollow fiber bundle and the fluid flow external to the hollow fibers is as even as possible, and the exchange of matter is therefore optimized.

According to the invention, this task, based on the generic filter device consisting of a cylindrical filter housing, and in which a bundle of curled hollow fibers is arranged, is solved in that the hollow fibers have an essentially sinusoidal texture, and are curled according to the following geometrical pattern:

$$5 \cdot d < \lambda < \frac{L}{12} \cdot \frac{1}{1+2\frac{D}{L}}, \tag{1}$$

whereby $\lambda$ represents the wavelength of the curled hollow fibers, d represents the exterior diameter of the hollow fiber, L represents the effective length of the hollow fibers, and D represents the diameter of the fiber bundle.

Through the geometric-based definition of the curling of the individual hollow fibers of the hollow fiber bundle, the flow resistance in axial direction, i.e., along the fibers, increased relative to the flow resistance into the interior of the bundle is achieved. The latter flow resistance value is generally even absolutely reduced. The result is that the part of the dialysate that flows through the interior of the bundle in a dialysis is increased, and the hollow fibers positioned in the interior are better utilized. This achieves an increased performance of matter exchange in comparison to long-wave curled fibers, or fibers completely without curling. The creation of a turbulent flow of the fluid flushing the hollow fiber, as well as the fluid distribution resulting from this, should be responsible as such for this purpose. The invention is based on the knowledge that the ratio of the fluid partial current flowing exterior of the fiber bundle flows to the fluid partial current that flows through the bundle depends on the ratio of the fiber bundle diameter to its utilized length, as well as on the flow resistances in axial direction (along the fibers) and in radial direction (lateral to the fibers in the direction of the bundle center).

In addition to the wavelength $\lambda$, the amplitude a plays an additional role in the effectiveness of the hollow fiber curling. Therefore, according to a preferred embodiment of the invention, the hollow fibers have the following amplitude a of the essentially sinusoidal curling according to the following equation:

$$\frac{d}{5} < a < \frac{\lambda}{5}. \tag{2}$$

If a falls below the value of d/5, the space between two values next to each other (wave consumption) becomes too small to conduct the necessary dialysate amount into the interior of the fiber bundle. However, if a>$\lambda$/5 is selected, the dialyser loses effectiveness due to the fact that the possible packing density of the fiber bundle is reduced in a predetermined dialyser housing.

According to a special embodiment of the invention, the curling of the hollow fiber may have a three-dimensional orientation according to the following formulas:

$$\bar{x}(z) = \begin{pmatrix} a \cdot \sin\left(\frac{2\pi z}{\lambda} \cdot u\right) \cdot \sin\left(\frac{2\pi z}{\lambda}\right) \\ a \cdot \cos\left(\frac{2\pi z}{\lambda} \cdot u\right) \cdot \sin\left(\frac{2\pi z}{\lambda}\right) \\ z \end{pmatrix}, \quad (3)$$

whereby: $0.05 < u < 0.14$, and whereby $\bar{x}(z)$ represents the space vector between the coordinate origin and the spatial position of a hollow fiber that extends along the z-axis, and u represents the amount of rotations per wavelength $\lambda$.

Corresponding to the previously mentioned equation, the curling of the hollow fibers rotates in a circular pattern. This means that the mathematical vector of the amplitude that is based on the z-axis and ends at the fiber, runs through a certain angle area within the distance $\lambda$. This creates a three-dimensional structure similar to a helix. While it may happen in a two-dimensional structure that all fibers "fall over," and thereby form an isotropic structure that makes the penetration of the dialysate into the bundle dependent upon the direction, a three-dimensionally curled fiber bundle is isotropic, and ensures the even penetration of the dialysate into the interior of the bundle from all sides.

Preferably, the fiber allocation in the cylindrical filter housing can be between 60.5% and 70%, even more preferably from 60.5% to 67.5%. Dense packing with a seal by means of grouting in the end area of the hollow fiber bundle is possible with these packing densities.

Particularly advantageous, the fiber allocation in the cylindrical filter housing can be between 63.5% and 65.5%. The fiber allocation is calculated from the percentages of the cross section surface allocated by the fibers per utilizable cross section surface in the filter housing. The utilizable cross section surface is 0.907 times the cross section surface. This value is calculated from the maximum packing density (hexagonal arrangement), which should correspond to an allocation of 100%. The above stated allocation information can be achieved particularly with the use of the dimensions appropriate to this invention of the hollow fibers, and simultaneously ensure that the polyurethane matter evenly penetrates the fiber bundle with the grouting of the fibers similar to—as previously described—the dialysate evenly entering the interior of the bundle in the dialysis. Especially by the even penetration of the polyurethane matter, which subsequently solidifies and firmly fixes the fiber bundle as such at both ends, the simultaneous allocation of the fiber bundle, and therefore the previously mentioned high packing density can be achieved.

The effect of the invention is also achieved by a combination of elongated flat and three-dimensionally curled fibers, if at least 10% of three-dimensionally curled fibers are used in the fiber bundle.

The invention is based on a curled hollow fiber for optional use in the form of a bundle in hollow fiber dialysers that may have different diameters. D, from a minimum diameter $D_{MIN}$ up to a maximum diameter $D_{MAX}$. In this case, an optimal hollow fiber shape should be provided, if possible, which can be used for hollow fiber dialysers of various diameters. The curled hollow fiber for use in filter housings of various diameters is calculated from the following equation:

$$5 \cdot d < \lambda < \frac{L}{12} \cdot \frac{1}{1 + 2\frac{DMax}{L}}, \quad (4)$$

whereby $\lambda$ represents the wavelength of the curled hollow fiber, d represents the diameter of the hollow fiber, L represents the effective length of the hollow fibers, and $D_{MAX}$ represents the diameter of the fiber bundle for the fiber housing with the maximum interior diameter.

An example embodiment of the hollow fibers consists of 90 to 99 weight percent of a hydrophobic first polymer, and 10 to 1 weight percent of a hydrophilic second polymer, whereby the hydrophobic first polymers are selected from the following group: polyarylsulfons, polycarbonates, polyamides, polyvinyl chlorides, modified acrylic acid, polyether, polyurethane, or their co-polymers, and whereby the hydrophilic second polymers are selected from the following group: polyvinylpyrrolidon, polyethylene glycol, polyglycolmonoesther, co-polymers from polyethylene glycol with polypropylenglycol, water soluble derivatives of cellulose or polysorbates. This composition of microporous hollow fibers has already been described in detail in EP 0168783 A1, which also includes additional details for this example.

Additional examples for the embodiment of the hollow fibers regarding their composition and morphology are found in EP 0 305 787 A1, as well as in the published application DE 21 45 183. We expressly refer to the disclosure of these applications.

The invention is also based on a method for filling a filter device, especially a hollow fiber dialyser, whereby the air present at the beginning of the filling operation in the exterior space, i.e., in the space surrounding the hollow fibers, is displaced by means of a fluid volume flow that is guided from top to bottom through the filter housing. The fluid volume flow for the filling of the filter housing is preferably approximately 500 ml/min. Surprisingly it has been shown that both fluid chambers of the dialyser can be filled by means of the construction of the hollow fiber dialyser as described above, without having to turn the dialyser by 180°.

According to prior art, in which the fiber bundle was not constructed as evenly and as densely packed, as it is possible according to the invention at hand, the system had to be filled from the bottom to the top at a vertical filter position for the air-free filling of said system. As for the dialyzing fluid pump, and the blood pump discharge in reverse of one another, the filling of each chamber with dialyzing fluid according to prior art had to occur on the dialyser side, or with isotone salt solution successively on the blood side, whereby the filter had to be turned by 180° before performing the second step. This procedural step for the filling operation is no longer necessary with the new filter. The dialysate space can be filled from the top to the bottom. The filling can occur simultaneously with the filling on the blood side, without having to turn the dialyser.

Finally, the invention relates to the use of the previously described filter device for the filling of the filter housing by means of a fluid volume flow that is guided through the filter housing from top to bottom. This use of the filter device enables a quick, and especially air-free filling of the system. The higher filling velocity results from the fact that both fluid chambers of the dialyser, i.e., the chambers on the dialyser side and on the blood side, can be filled simultaneously without having to turn the filter device.

FIG. 1 shows a micro-curled hollow fiber bundle at the effective length L with the diameter D. It is arranged in a known and usual way in a filter housing that is not illustrated in detail. The construction of the filter device is generally extensively known, and is therefore not explained in detail. Generally, a known filter device exists, such as a hollow fiber dialyser, comprised of a tube-shaped housing that includes the hollow fiber bundle, whereby the ends of the hollow fiber bundle are connected at the ends of the tube-shaped housing by means of a compound. In this filter device, the housing is arranged in a limited way to the compounds with radial connectors, which form the inputs and outputs to the second flow area. For the opening of the capillary tubes of the hollow fiber bundle that are enclosed by the compounds, they are spliced at their ends.

Sealing caps are then placed on the ends of the tube-shaped jackets that are equipped with connectors, which form the inputs and outputs of the first flow area.

Reference is made to the disclosure of DE 198 57 850 and EP-A-0844015.

According to the invention, a sinusoidal texture is preferably created from hollow fiber membranes, whereby the wavelength λ of the periodic structure is closely tied to the outer diameter d of the hollow fiber (compare FIG. 2), as well as with the effective fiber length L and the bundle diameter D (compare FIG. 1) of the fiber bundle. The optimal λ is within the following range:

$$5 \cdot d < \lambda < \frac{L}{12} \cdot \frac{1}{1 + 2\frac{D}{L}}. \quad (1)$$

Figure 2:
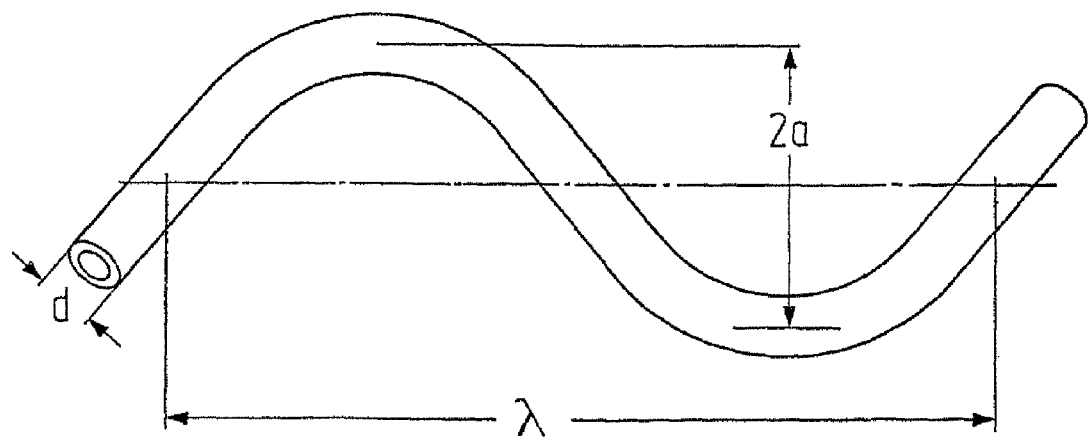
FIG. 2 shows an embodiment of the geometry of an individual hollow fiber according to the present invention.

According to equation 1 it is not appropriate to choose a wavelength that is smaller than five times the outer diameter d of the fiber (FIG. 2). This can be explained by the fact that, falling short of 5 d, wave loops are no longer created in the hollow fiber that enable the dialysate to enter the interior of the fibers. The wavelength λ is limited in the upper range by means of the effectiveness in the performance increase. It was surprisingly found that the presence of 12 wavelengths per fiber length L is sufficient for "thin dialysers," i.e., diameter to length ratios of D/L<0.14, in common fiber diameters. In the case of "thicker dialysers" with an unfavorable ratio of diameter to length, i.e., of D/L, it becomes more difficult for the dialysate to reach the center of the fiber bundle at the same wavelength λ. In order to compensate for this, the geometry for the calculation of the maximum wavelength by the factor 1/(1+2 D/L) is considered in the equation.

If the same wavelength λ is to be used for all dialyser sizes for a hollow fiber, the equation (1) D must be replaced by the maximum diameter $D_{MAX}$. Here a penetration of the fiber bundle is ensured even with unfavorable diameter to length conditions, especially when the dialysate flows through comparably narrower dialysers.

For dialysis fibers with a diameter of d=0.28 mm, and the dialyser with the largest thickness, having an effective length of L=225 mm, and a maximum inner diameter $D_{MAX}$ of =48 mm, a range of 1.4mm<λ<13.1mm is created for the wavelength λ.

In practical applications, values for the wavelength λ of

4mm<λ<12mm have proven particularly effective.

In addition to the wavelength λ, amplitude also plays a major role in the effectiveness of the micro-curling. The amplitude a (compare FIG. 2) should be within the following range:

$$\frac{d}{5} < a < \frac{\lambda}{5}. \quad (2)$$

If a falls short of the value of d/5, the space between two adjoining waves becomes too small in order to feed the required amount of dialysate into the interior of the fiber bundle.

However, if a is larger than λ/5, a comparatively smaller packing density is put up with, which leads to a decrease of the effectiveness of the matter exchange.

By means of the so-called micro-curling, it is ensured that the dialysate is fed everywhere along the hollow fibers into the hollow fiber interior through the wave loops, and the flow along the hollow fibers is simultaneously always re-directed and decelerated. In this way, an optimal matter exchange can occur along the exchange surface.

Particular benefits arise from the use of the hollow fibers equipped with the previously mentioned micro-curling in the shape of a tightly packed fiber bundle, in particular corresponding to the previously discussed packing density, as a filter device with such a hollow fiber package can be filled more easily. Here, both fluid chambers, namely the one on the dialysate side, as well as the chamber on the blood side, can be filled simultaneously, and especially air-free. This results in a decisive advantage as opposed to the current prior art, in which the chamber for the dialysis fluid, and the chamber on the blood side must be filled successively, whereby the filter device additionally had to be turned by 180 degrees for an air-free filling. This was due to a complicated handling procedure, which is no longer necessary with the use of the micro-curled hollow fiber in the filter device described herein.

What is claimed is:

1. A method for filling a hollow fiber dialyser for hemodialysis, comprising the steps of:

using a cylindrical filter housing with a bundle of hollow fibers arranged therein, wherein a volume of air is present in the housing in a space surrounding the hollow fibers;

guiding a first fluid volume flow from a top portion to a bottom portion of the cylindrical filter housing; and displacing the volume of air present at the beginning of the guiding step in the space surrounding the hollow fibers with the first fluid volume such that the space surrounding the hollow fibers is air-free, wherein a fiber allocation in the cylindrical filter housing is between 60.5% and 70%, and wherein the hollow fibers of the bundle each have a curling according to the following:

$$\frac{d}{5} < a < \frac{\lambda}{5}$$

λ representing a wavelength of each of the curled hollow fibers, d representing an outer diameter of each of the curled hollow fibers, and a representing an amplitude of the periodic texture, wherein 4 mm<λ<12 mm.

2. A method for filling a hollow fiber dialyser for hemodialysis, comprising the steps of:

using a cylindrical filter housing with a bundle of hollow fibers arranged therein, wherein a volume of air is present in the housing in a space surrounding the hollow fibers;

guiding a first fluid volume flow from a top portion to a bottom portion of the cylindrical filter housing; and displacing the volume of air present at the beginning of the guiding step in the space surrounding the hollow fibers with the first fluid volume such that the space surrounding the hollow fibers is air-free, wherein a fiber allocation in the cylindrical filter housing is between 60.5% and 70%, and wherein the hollow fibers of the bundle each have a curling according to the following:

$$\frac{d}{5} < a < \frac{\lambda}{5}$$

$\lambda$ representing a wavelength of each of the curled hollow fibers, d representing an outer diameter of each of the curled hollow fibers, and a representing an amplitude of the periodic texture, wherein 4 mm<$\lambda$<12 mm, and wherein the first fluid volume flow is approximately 500 ml/min.

3. The method according to claim 1, further comprising the step of:

simultaneously filling a space within the hollow fibers with a second fluid volume flow without having to turn the filter device.

4. The method according to claim 1, wherein the curling of each of the hollow fibers has a three-dimensional structure according to the following formula:

$$\bar{x}(z) = \begin{pmatrix} a \cdot \sin\left(\frac{2\pi z}{\lambda} \cdot u\right) \cdot \sin\left(\frac{2\pi z}{\lambda}\right) \\ a \cdot \cos\left(\frac{2\pi z}{\lambda} \cdot u\right) \cdot \sin\left(\frac{2\pi z}{\lambda}\right) \\ z \end{pmatrix}$$

wherein:

05<$u$<0.14, $\bar{x}(z)$ represents the space vector between the coordinate origin and the spatial position of a hollow fiber that extends along the z-axis, and u represents the amount of rotations per wavelength $\lambda$.

5. The method according to claim 1, wherein a fiber allocation in the cylindrical filter housing is between 60.5% and 67.5%.

6. The method according to claim 1, wherein a fiber allocation in the cylindrical filter housing is between 63.5% and 65.5%.

7. The method according to claim 1, wherein at least 10% of the hollow fibers are three-dimensionally curled.

8. The method according to claim 1, wherein the hollow fibers each comprise 90 to 99 percent by weight of a hydrophobic first polymer and 10-to-1 weight percent of a hydrophilic second polymer, wherein the hydrophobic first polymers are selected from the following group: polyarylsulphons, polycarbonates, polyamides, polyvinyl chloride, modified acrylic acid, polyethers, polyurethanes or their co-polymers, and wherein the hydrophilic second polymers are selected from the following group:

polyvinylpyrrolidone, polyethylene glycol, polyglycol monoester, copolymers of polyethylene glycol with polypropylene glycol, water-soluble derivatives of cellulose or polysorbates.

9. A method, comprising:

filling a filter device according to the method of claim 1, wherein the first fluid is a dialysate; and dialyzing blood with the filled filter device, the blood being disposed in a space within the hollow fibers.

* * * * *